(12) United States Patent
Tanaka et al.

(10) Patent No.: US 7,991,290 B2
(45) Date of Patent: Aug. 2, 2011

(54) OPTICAL PRISM AND OPTICAL TRANSCEIVER MODULE FOR OPTICAL COMMUNICATIONS

(75) Inventors: Ken'ichi Tanaka, Tokyo (JP); Masato Shishikura, Ome (JP); Kenro Sekine, Fuchu (JP); Toshiki Sugawara, Kokubunji (JP); Yasunobu Matsuoka, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 11/602,356

(22) Filed: Nov. 21, 2006

(65) Prior Publication Data

US 2007/0146881 A1   Jun. 28, 2007

(30) Foreign Application Priority Data

Dec. 12, 2005  (JP) ................................. 2005-357689

(51) Int. Cl.
*H04J 14/02* (2006.01)
*H04B 10/00* (2006.01)

(52) U.S. Cl. .............. 398/86; 398/88; 398/85; 398/135; 398/138

(58) Field of Classification Search .......... 398/135–139, 398/86, 85, 88, 128, 130, 82, 79; 359/831, 359/833, 837, 431, 366, 365, 362, 642, 646, 359/647

See application file for complete search history.

(56) References Cited

U.S. PATENT DOCUMENTS

| | | | | |
|---|---|---|---|---|
| 5,526,168 | A | * | 6/1996 | Parl ............................. 359/226.1 |
| 6,783,242 | B1 | * | 8/2004 | Hirata et al. .................... 353/20 |
| 7,289,737 | B2 | * | 10/2007 | Ohmuro ........................ 398/128 |
| 2007/0071444 | A1 | * | 3/2007 | Okada et al. .................. 398/135 |

FOREIGN PATENT DOCUMENTS

| | | | |
|---|---|---|---|
| JP | 3-186805 | * | 8/1991 |
| JP | 2000-180671 | | 12/1998 |
| JP | 2005-043635 | | 7/2003 |
| JP | 2005-084188 | | 9/2003 |
| JP | 043635 | * | 2/2005 |

* cited by examiner

*Primary Examiner* — M. R. Sedighian
(74) *Attorney, Agent, or Firm* — Stites & Harbison PLLC; Juan Carlos A. Marquez, Esq.

(57) ABSTRACT

To provide an optical transceiver module comprising an optical prism for optical communications which has mounting portions, a light emitting portion, light receiving portions, a substrate and a sub-mount that are used as the basis of the optical transceiver module, whose configuration is compact with reduced components which are accurately mounted.

A sub-mount is provided on the substrate. The composite optical prism is formed with an optical lens provided with mounting supports and a wavelength division film in an integrated fashion. By using marks on the sub-mount for alignment, the composite optical prism can be mounted accurately on the sub-mount. In addition, the light receiving portions and the light emitting portion can be mounted accurately by using marks for alignment provided on the substrate and the sub-mount.

31 Claims, 10 Drawing Sheets

(A)

(B)

(C)

(D)

OPTICAL PRISM AND OPTICAL TRANSCEIVER MODULE FOR OPTICAL COMMUNICATIONS

CLAIM OF PRIORITY

The present application claims priority from Japanese application JP 2005-357689 filed on Dec. 12, 2005, the content of which is hereby incorporated by reference into this application.

FIELD OF THE INVENTION

The present invention relates to an optical system which comprises an optical prism for optical communications having a wavelength division multiplexing filter, a right-angled prism and a hemisphere lens, and mounting supports integrated with the optical prism for optical communications, and to an optical transceiver module in which a sub-mount is used to mount the optical system mounted on a substrate on which laser diodes for optical transmission and photo detectors for optical reception are formed.

BACKGROUND OF THE INVENTION

Since 2000, high-speed communications have rapidly proliferated due to ADSL (Asynchronous Digital Subscriber Line) services for which metal cables are used, changing the broadband services to high-speed Internet access. Further, FTTH (Fiber To The Home) high-speed Internet access has begun to be offered commercially through connection of a node to each home with optical fibers for video transmission services like CATV lines. Today's FTTH access networks support high-speed and broadband services with bidirectional transmission over a single optical fiber to each optical network unit (ONU) (optical transceiver module) which is an optical subscriber line terminal installed on a telephone pole or within an apartment building such as a condominium. To further expand the FTTH, it is necessary to lower the connection fee-s by reducing the equipment/installation costs. In particular, it is demanded to reduce the size and cost of ONUs which occupy a large part of the cost.

The FTTH optical access network is characterized by its transmission system called WDM (Wavelength Division Multiplexing) transmission. Specifically, optical signals from a plurality of optical sources (for example, laser diodes) of different wavelengths are multiplexed into a single composite optical signal by a wavelength division multiplexing module on the transmitter side. The single composite optical signal is entered into a single optical fiber. On the receiver side, a wavelength division demultiplexing module demultiplexes the single composite optical signal according to the wavelengths before conversion to electrical signals by photo detectors (for example, photodiodes). In addition, the WDM (Wavelength Division Multiplexing) transmission system can easily realize bidirectional transmission, allowing a single optical fiber to transmit signals in two directions simultaneously. For example, in one direction, an optical signal of wavelength λ1 enters from the node into the optical fiber and is received by a photo detector on the access side. In the other direction, an optical signal of wavelength λ2 enters from the access side into the optical fiber and is received by a photo detector at the node. In this case, each of the node and the access side has a wavelength division multiplexing/demultiplexing module (bidirectional optical module). In recent years, since three services, namely telephony, video and data services have become popular, the ONU is required to support multiple wavelength bidirectional transmission.

Thus, the ONU (optical subscriber line terminal) is provided with an optical transceiver module capable of multiplexing and demultiplexing multiple wavelengths. For example, an optical transceiver module disclosed in Japanese Patent Laid-Open No. 2000-180671 (Patent Document 1) comprises a wavelength division multiplexing filter to multiplex/demultiplex two wavelengths, a condenser lens to efficiently couple an optical signal from an optical fiber to a passive optical component and a condenser lens to efficiently couple an optical signal from a laser diode to the optical fiber. This type of optical transceiver module are also disclosed in Japanese Patent Laid-Open No. 2005-45635 (Patent Document 2) and Japanese Patent Laid-Open No. 2005-84188 (Patent Document 3). Each of them is designed so as to reduce the number of components.

[Patent Document 1] Japanese Patent Laid-Open No. 2000-180671

[Patent Document 2] Japanese Patent Laid-Open No. 2005-43635

[Patent Document 1] Japanese Patent Laid-Open No. 2005-84188

SUMMARY OF THE INVENTION

Each of these Patent Documents shows an optical transceiver module designed to reduce the number of components for downsizing. In assembling the module, however, it may be difficult to accurately position each component for assembling the module while securing a specified optical coupling efficiency.

The present invention was made in view of the above-mentioned problems. It is a first object of the present invention to provide an optical prism for optical communications for which mounting supports are provided. The mounting supports allow components to be reduced and has a more compact configuration. It is a second object of the present invention to provide an optical transceiver module whose members can easily be positioned with respect to the optical prism for optical communications, light emitting elements and passive optical elements, each of which is mounted in the optical transceiver module, when the optical transceiver module is assembled.

BRIEF DESCRIPTION OF THE DRAWINGS

FIG. 2 shows the individual configurations and mutual relations of the module's substrate, sub-mount structure and main components (laser diode, photo diode and optical fiber).

DESCRIPTION OF THE PREFERRED EMBODIMENT

Figure 1:
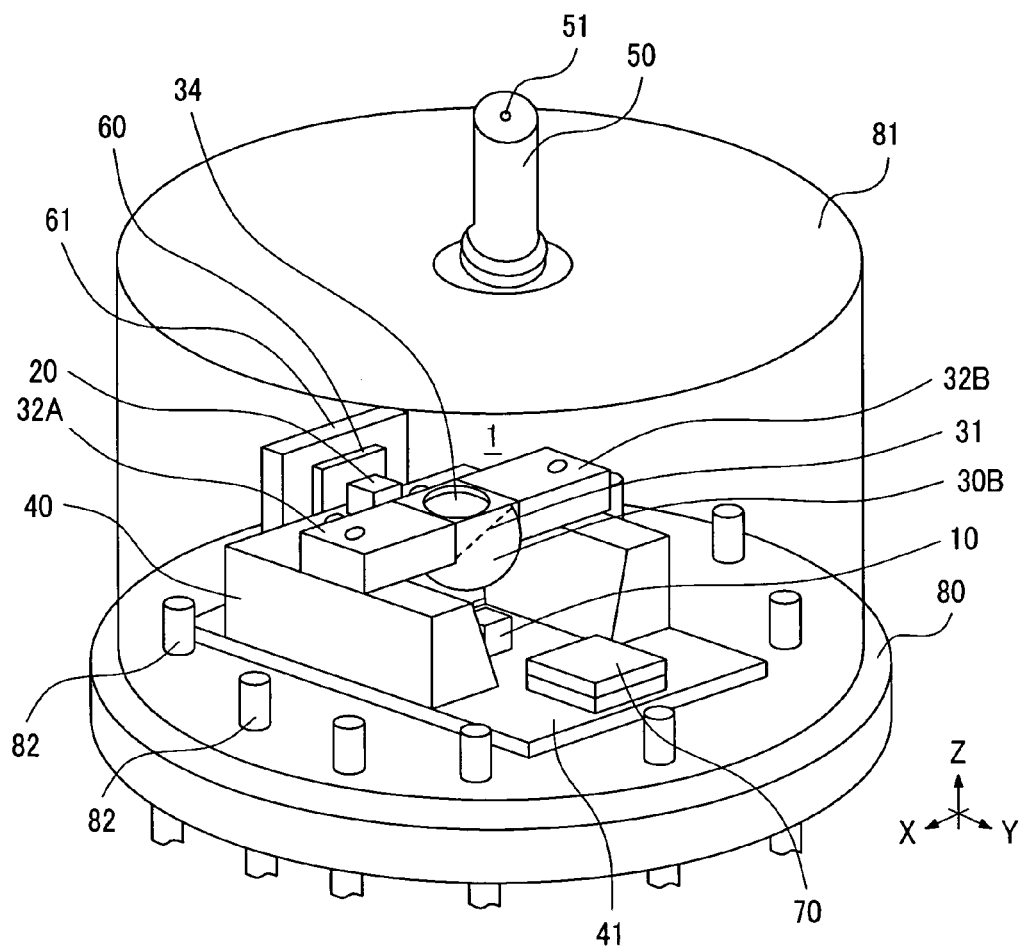
FIG. 1 schematically illustrates the configuration of an optical transceiver module, a first embodiment of the present invention.

Configurations of various embodiments of the present invention will be described below with reference to the drawings. In the drawings, same numerals denote same components to avoid unnecessary repetition. Also note that the relative dimensions of each component in the drawings is not always consistent with the description below.

Embodiment 1

Figure 2:
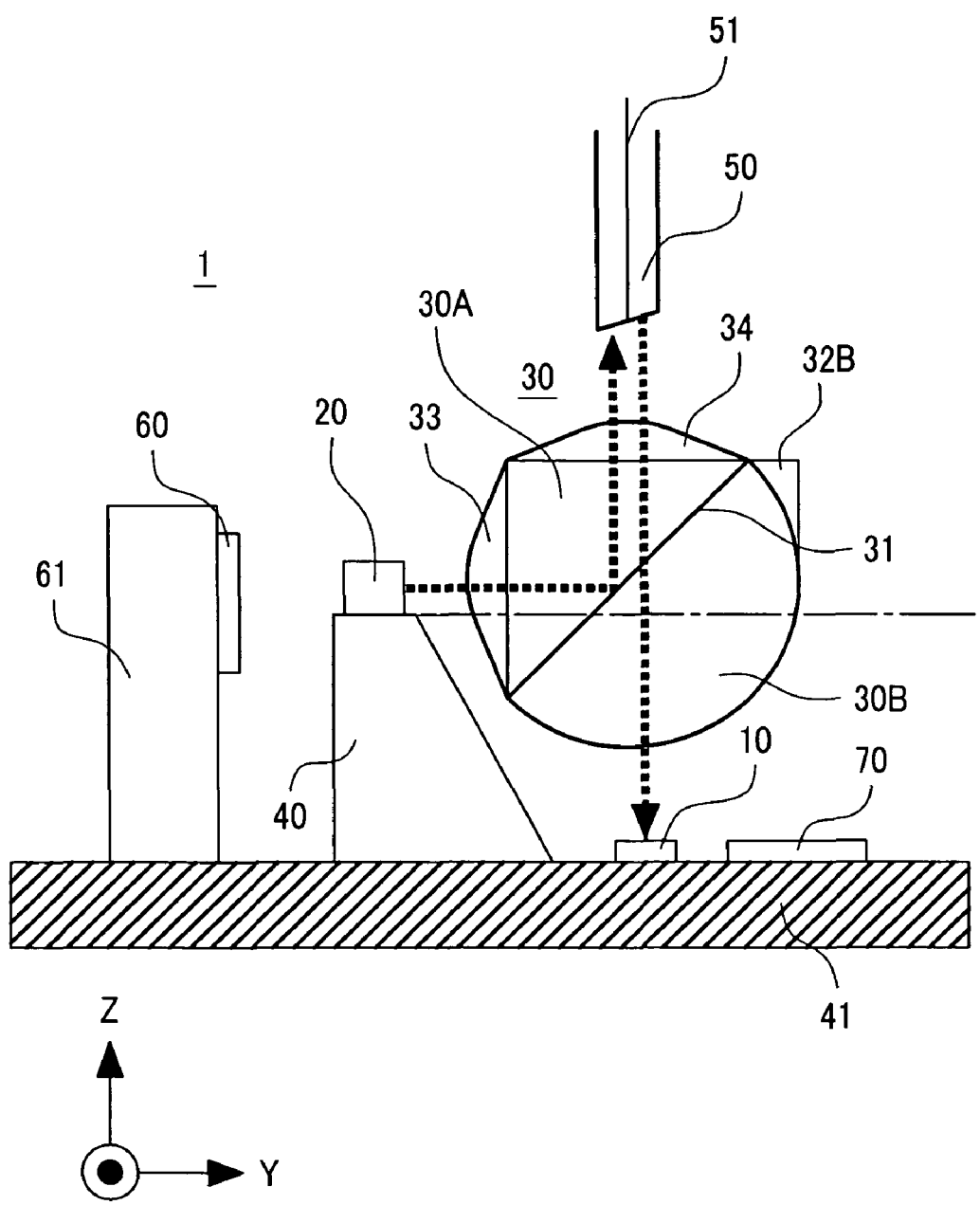
FIG. 2 is an enlarged cross section view of the optical transceiver module shown in FIG. 1.

With reference to FIGS. 1 and 2, the following describes the configuration of an optical transceiver module having an optical prism for optical communications according to a first embodiment of the present invention. FIG. 1 schematically illustrates the configuration of the optical transceiver module according to the first embodiment of the present invention. FIG. 2 is an enlarged cross section view of the optical transceiver module shown in FIG. 1. FIG. 2 shows the individual configurations and mutual relationships of a substrate, a sub-mount structure, and main components (laser diode, photo diode and optical fiber) of the optical transceiver module.

The optical transceiver module (hereinafter referred to as an "optical module") 1 shown in FIG. 1 may be provided as part of an optical network unit (ONU) to perform bidirectional communications using wavelength division multiplexing (WDM) transmission. The optical module 1 is mounted on a can package base 80 and protected by a cap 81. This figure is depicted on the assumption that the cap is transparent. In addition, the can package base 80 is provided with a plurality of connecting pins 82 by which the electrical components (transimpedance amplifier, etc.) 70 connected electrically with the laser diode, photo diode and other optical components of the optical module 1 are connected with the external. The pertinent wiring lines are omitted in the figure. An optical fiber 51 protected by an optical fiber ferrule 50 made of zirconium oxide (zirconia, $ZrO_2$), etc. is held by a cap 81. The optical fiber 51 is optically connected with the laser diode, photo diode and other optical components of the optical module 1. The optical module 1 is configured on a substrate 41. Reference numeral 40 denotes a square U-shape sub-mount formed on the substrate 41. The substrate 41 and the sub-mount 40 are formed by etching techniques from a semiconductor material, such as Si (silicon), which can be processed precisely. The top surface of the substrate 41 and that of the sub-mount 40 are used as reference levels for mounting a light emitting portion 20, a light receiving portion 10 and the optical prism 30 for optical communications.

The optical prism 30 for optical communications comprises, in an integrated manner, a right-angled prism 30A, a hemisphere lens 30B and a wavelength division multiplexing filter 31 sandwiched between the right-angled prism 30A and the hemisphere lens 30B with their slant surfaces opposing each other. The optical prism 30 for optical communications further comprises convex lenses 33 and 34 on the two surfaces forming a right angle of the right-angled prism. Mounting supports 32A and 32B are formed on both sides of the optical prism 30 in an integrated fashion. The light emitting portion 20 is mounted on the square U-shape sub-mount 40. The optical prism 30 is held between wing portions of the square U-shape sub-mount 40. The mounting supports 32A and 32B are provided so that the height of their bottom surfaces (a dashed line shown in FIG. 2) matches the height of the top of the square U-shape sub-mount 40 for the optical prism 30. As a result, the optical axis of the laser diode 20 matches that of the optical prism 30. The optical prism 30 has spectral characteristics to transmit either of a light beam with a first wavelength or a light beam with a second wavelength different from the first wavelength and reflect the other.

A light beam emitted from the laser diode 20 is collimated by an optical path indicated with a thick dotted line, that is, an optical path formed by the convex lens 33, right-angled prism 30A, wavelength division multiplexing filter 31, hemisphere lens 30B and convex lens 34 that are provided in the optical communication prism 30. The collimated light beam is incident on the optical fiber 51. A light beam emitted from the optical fiber 51, on the other hand, is collimated by an optical path indicated with a thick dotted line, that is, an optical path formed by the convex lens 34, right-angled prism 30A, wavelength division multiplexing filter 31, and hemisphere lens 30B that are provided in the optical communication prism 30. The collimated light beam is incident on the photo diode 10 provided on the substrate 41. The laser diode 20 comprises, for example, a laser diode (LD device) which generates a light signal L2 with a wavelength of $\lambda 2$ (=1.3 μm). The light receiving portion 10 comprises, for example, a photo diode (PD device) which receives a light signal L1 with a wavelength of $\lambda 1$ (=1.49 μm). A monitor photo diode 60 is provided on the side opposite to the side of the optical prism 30 and on a support portion 61. The monitor photo diode 60 checks an output of the LD device.

Figure 3A:
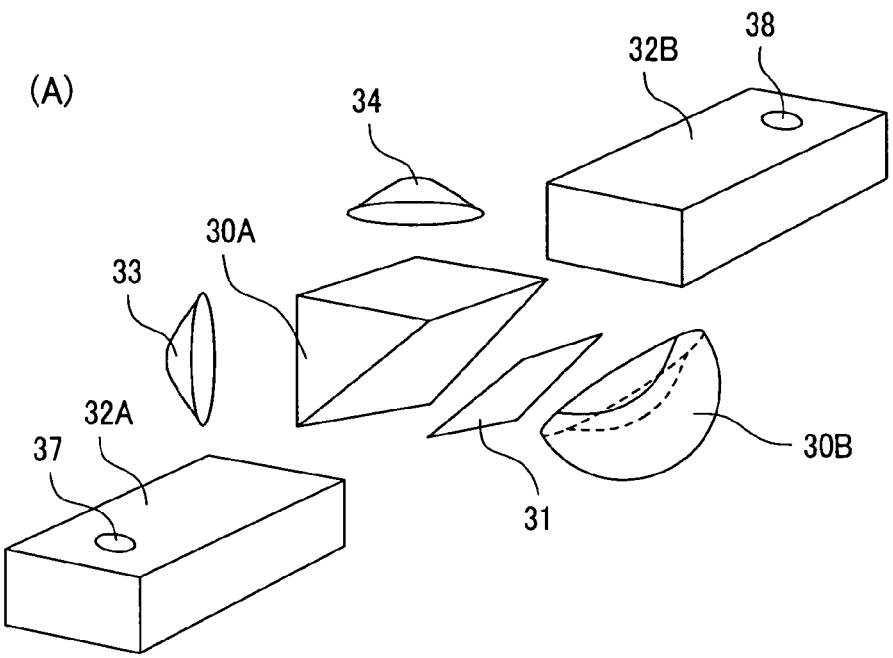
FIGS. 3A (A)-(D) are provided to explain the configuration of the optical communication prism according to the first embodiment.
Figure 3A:
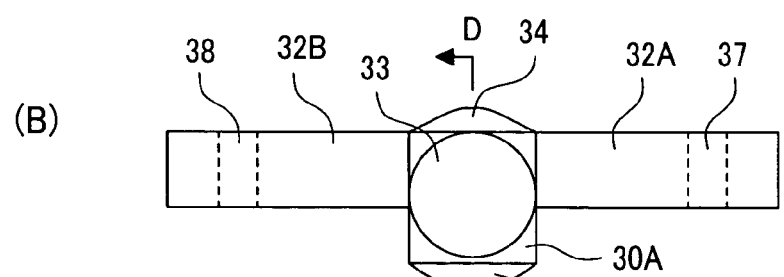
Figure 3A:
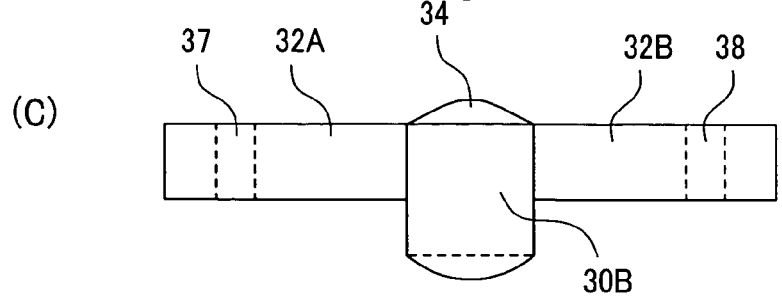
Figure 3A:
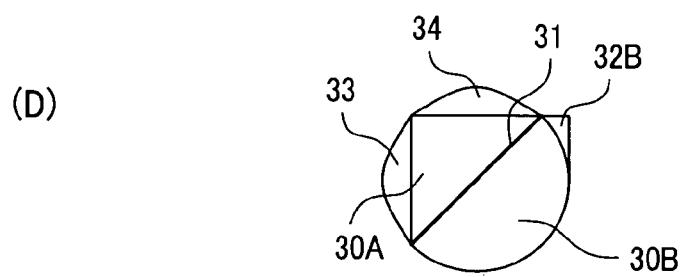

FIGS. 3A(A) to 3A(D) shows an exemplary configuration of the optical prism 30 for optical communications according to the first embodiment of the present invention.

FIG. 3A(A) is a perspective diagram showing the components of the optical prism 30 for optical communications. The optical prism 30 comprises the right-angled prism 30A, the hemisphere lens 30B and the wavelength division multiplexing filter 31 which is an optical thin film sandwiched between the right-angled prism 30A and the hemisphere lens 30B with their slant surfaces opposing each other. The right-angled prism 30A is a triangular prism. Each of its sides is an isosceles triangle. The slant surface of the right-angled prism 30A is fixed to that of the hemisphere lens 30B through the wavelength division multiplexing filter 31. The optical communication prism 30 has wavelength selectivity so as to demultiplexes and multiplexes light signals of different wavelengths (such as the abovementioned light signals L1 and L2 having wavelengths $\lambda 1$ and $\lambda 2$, respectively). Specifically, the wavelength division multiplexing filter 31 directly transmits the light signal L1 of wavelength $\lambda 1$ while not transmitting the light signal L2 of wavelength $\lambda 2$. In this case, the light signal L2 of wavelength λ2 is reflected at the slant surface of the right-angled prism 30A in a direction perpendicular to the direction of incidence. The convex lenses 33 and 34, which are optical elements, are formed on the surfaces forming a right angle of the right-angled prism 30A. Although the convex lens 33 shown in the figure is a spherical lens, it may also be an aspheric lens. Alternatively, it may be a diffraction optical device such as a Fresnel zone plate having a hologram pattern. After the slant surface of the hemisphere lens 30B is fixed to that of the right-angled prism 30A, the unnecessary side portions of the hemisphere lens 30B are removed until the side surfaces are aligned with those of the right-angled prism 30A. The mounting supports 32A and 32B are formed on these side surfaces in an integrated fashion. As mentioned above, the mounting supports 32A and 32B are located/formed so that the optical axis of the optical communication prism 30 is aligned with that of the light emitting portion 20 when the optical communication prism 30 is mounted with the sub-mount 40. The mounting supports 32A and 32B have holes 37 and 38 formed therein, respectively. The holes 37 and 38 are used for alignment with guide marks when the optical communication prism 30 is mounted on the sub-mount 40 as described later.

The optical module 1 comprises the light receiving portion 10 (photo diode) capable of detecting the light signal L1 as input light, the light emitting portion 20 (laser diode) capable of emitting the light signal L2 as output light, and the optical prism 30 that can selectively transmit/reflect light signals L1 and L2, and that has the lens function and is provided with the mounting supports. The optical module 1, therefore, can perform bi-directional transmission by using the single optical fiber 51 while the configuration is relatively compact.

FIGS. 3A(B) is a side view of the optical communication prism 30 combined with the mounting supports 32A and 32B, as viewed from the light incidence side on which light is incident (convex lens 33 side).

FIG. 3A(C) is a side view of the optical prism 30 combined with the mounting supports 32A and 32B, as viewed from the rear side (opposite to the side of FIG. 3A(B)).

FIG. 3A(D) shows a cross section taken along D-D line of FIG. 3A(B), as viewed in the direction of the arrows. A part of the mounting support 32B appears behind the optical prism 30.

Figure 3B:
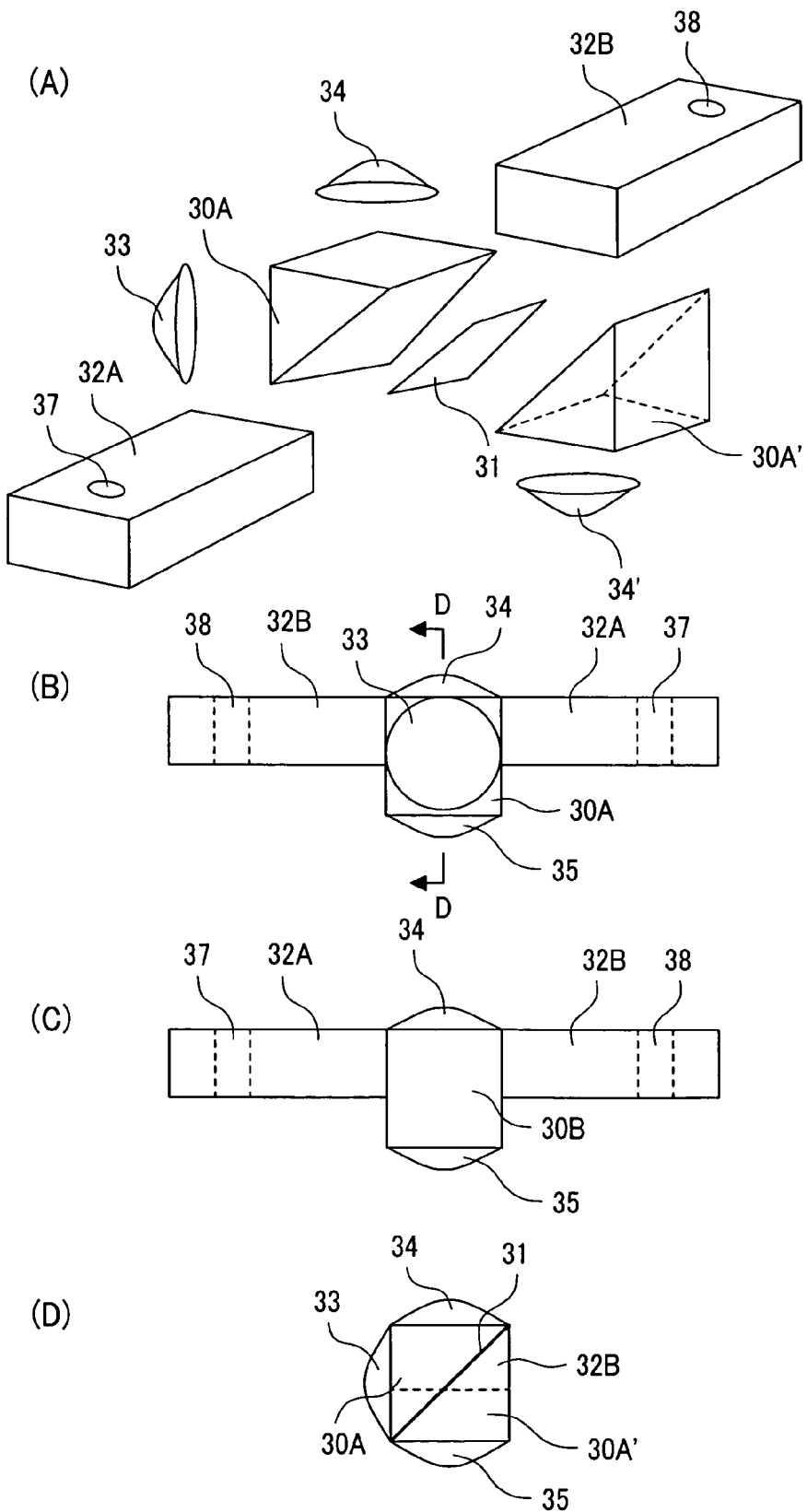
FIGS. 3B (A)-(D) are provided to explain a variation of the first embodiment shown in FIGS. 3A(A)-(D). While the optical communication prism of the first embodiment is configured by combining a right-angled prism with a half-ball prism, the optical communication prism of this variation is configured by combining a right-angled prism with another right-angled prism which is in surface symmetry to the other right-angled prism.

FIGS. 3B(A) to 3B(D) show a variation of the first embodiment shown in FIGS. 3A(A) to 3A(D). While the optical communication prism 30 of the first embodiment is configured by combining the right-angled prism 30A with the hemisphere prism 30B, the optical prism 30 of this variation is configured by combining the right-angled prism 30A with another right-angled prism 30A'. The right-angled prism 30A' and right-angled prism 30A in plane symmetry with respect to the slant surfaces.

FIGS. 3B(A) to 3B(D) correspond with FIGS. 3A(A) to 3A(D), respectively. Comparing the two types, only the hemisphere lens 30B (hemisphere prism) is replaced with the right-angled prism 30A'. Thus, there is little difference between the two types. One of the changes is that an optical element, namely a convex lens 34' is formed on one of the two surfaces forming a right angle of the right-angled prism 30A' since the right-angled prism 30A' does not have a convex lens function, not like the hemisphere prism 30B. The cross section in FIG. 3B(D) clearly shows that the right-angled prism 30A' is used instead of the hemisphere prism 30B and the convex lens 34' is formed. Also in this example, since the mounting supports 32A and 32B have the same width as the right-angled prism 30A, the mounting support 32B is hidden by the right-angled prisms 30A and 30A' in FIG. 3B(D) as depicted by a broken line. In addition, unlike the first embodiment using the hemisphere lens 30B, it is not necessary to remove the side surfaces of the right-angled prism 30A' since the combined right-angled prisms 30A and 30A' are in plane symmetry.

Figure 4A:
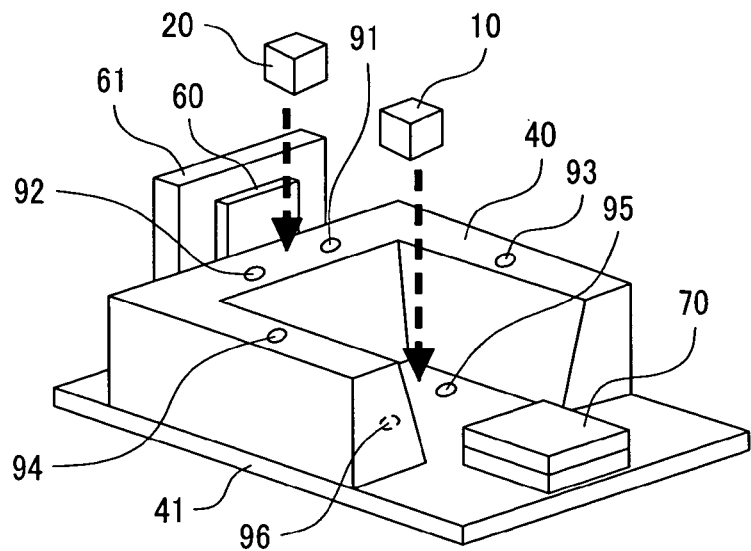
FIGS. 4A and 4B are perspective diagrams to explain how the optical components, namely a photo diode, a laser diode and an optical communication prism are mounted on the substrate and the sub-mount.

FIGS. 4(A) and (B) are perspective diagrams to explain how optical components, namely the light receiving portion 10, the light emitting portion 20 and the optical prism 30 are mounted on the substrate 41 and the sub-mount 40.

According to the present invention, guide marks are provided on the substrate 41 and the sub-mount 40 to indicate where the optical components are to be attached. Reference numerals 91 and 92 denote marks which are provided on the top of the sub-mount 40 to locate the light emitting portion 20. Also on the top of the sub-mount 40, marks 93 and 94 are provided to locate the optical prism 30 for optical communications. On the substrate, marks 95 and 96 are provided to locate the light receiving portion 10. During the process of shaping the substrate 41 or the sub-mount 40 by using a high precision etching technique, these marks can accurately be formed by the same etching technique.

As indicated by arrows with a dashed line in FIG. 4(A), the marks 91 and 92 are used to guide the light emitting portion 20 when it is mounted on the sub-mount 40. Likewise, the marks 95 and 96 are used to guide the light receiving portion 10 when it is mounted on the substrate 41.

Figure 4B:
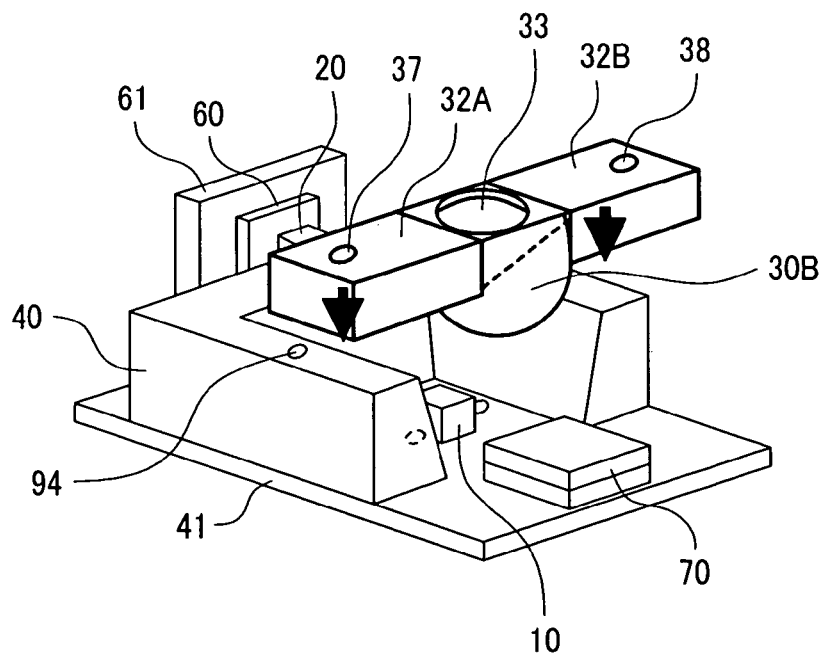

FIG. 4(B) shows the optical prism 30 being mounted by using the marks 93 and 94 as indicated by arrows although the mark 93 is hidden by the optical prism 30. The optical prism 30 is mounted on the sub-mount 40 while checking whether the holes 37 and 38 formed in the mounting supports 32A and 32B are aligned with the marks 93 and 94. The holes 37 and 38 shown in the figure may be omitted. In this case, the side surfaces of the mounting supports 32A and 32B may be aligned with the marks. Alternatively, the substrate 41 and the sub-mount 40 may have convex portions formed thereon instead of guide marks. In this case, alignment is done by mating these convex portions with concave portions formed in the optical components. It is also possible to form pits in the substrate 41 and sub-mount 40 and align the pits with the respective holes in the optical components by using pins.

As described above, the optical communication prism 30 of the first embodiment is refractive due to the hemisphere lens 30B and the right-angled prism 30A which has convex lenses 33 and 34 formed respectively on its two surfaces which are perpendicular to each other. Therefore, the light signal L2 from the laser diode 20 can be focused by the convex lens 33 before reflected by the junction surface 31 and can be focused further by the convex lens 34 before incidence on the optical fiber 51 while the configuration is simple. Likewise, before incidence on the light receiving portion 10, the light signal L2 emitted from the fiber 51 can be focused by convex portions of the hemisphere lens 30B after passing through the junction surface 31.

Although not described above, the right-angled prism 30A and the hemisphere lens 30B can be combined by using concavo-convex engagement as described in Embodiment 2. That is, a concave portion is formed on the slant surface of the right-angled prism 30A and a convex portion is formed in the corresponding area of the slant surface of the hemisphere lens 30B. Then, they are assembled so as to engage the concave portion with the convex portion. Thus, their optical axes are aligned with each other as a result of this assembling operation. This requires no separate operation to align their optical axes, resulting in reduction in the cost.

Embodiment 2

In the optical prism 30 of the first embodiment mentioned above, the wavelength division multiplexing filter 31 is directly stuck to the slant surface (joint surface) of the right-angled prism 30A and that of the hemisphere lens 30B. Therefore, these joint surfaces are coated with an adhesive such as a ultra-violet cured resin. In a second embodiment, a concave portion, thicker than the wavelength division multiplexing filter 31, is formed in the slant surface of the hemisphere lens 30B. The wavelength division multiplexing filter 31 is set in this convex portion.

Figure 5A:
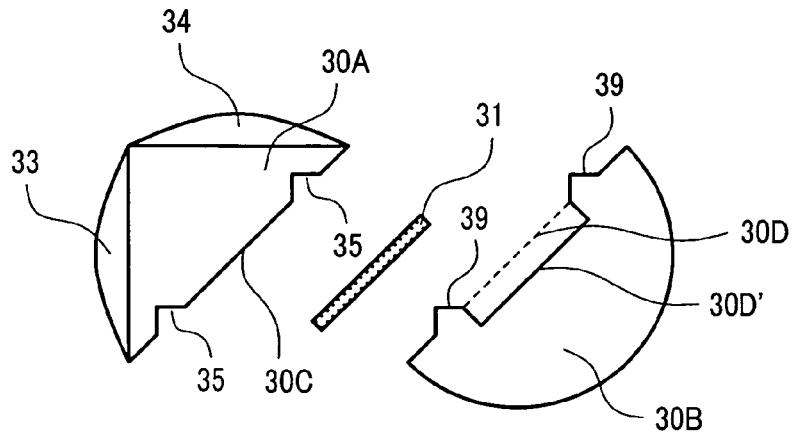
FIG. 5A shows a cross section of components of an optical communication prism, a second embodiment.

FIG. 5(A) shows a cross section of the components constituting the optical prism 30 of the second embodiment. Concaves 35 are formed at both ends of the slant surface 30C of the right-angled prism 30A. As mentioned above in the description of the first embodiment, the slant surface 30D (indicated by a broken line) of the hemisphere lens 30B has convexes 39 formed at both ends for engagement with the concaves 35 in the slant surface 30C. In addition, the hemisphere lens 30B has a slant surface 30D' formed below the broken line. Reference numeral 31 refers to a wavelength division multiplexing filter as mentioned in the description of the first embodiment. From the slant surface 30D indicated by the broken line, the slant surface 30D' is retreated by a thickness more than the thickness of the wavelength division multiplexing filter 31.

Figure 5B:
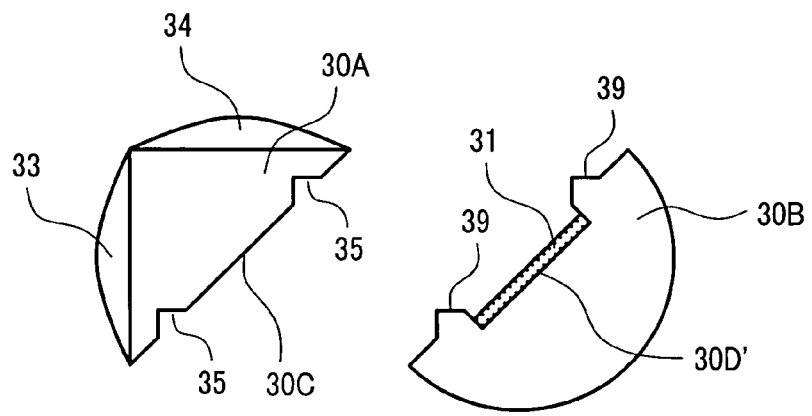
FIG. 5B shows how a wavelength division multiplexing filter 31 is attached to the slant surface.

In FIG. 5(B), the wavelength division multiplexing filter 31 is stuck to the slant surface 30D'.

Figure 5C:
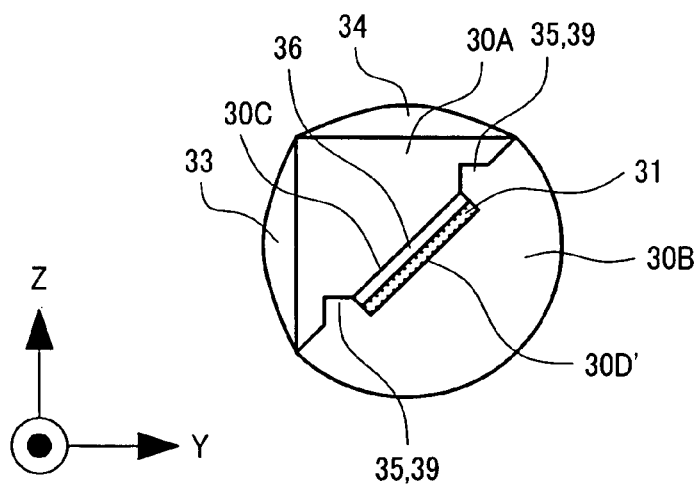
FIG. 5C shows the optical prism assembled after FIG. 5B.

In FIG. 5(C) which follows FIG. 5(B), the right-angled prism 30A and the hemisphere lens 30B are assembled with the concaves 35 engaged with the convexes 39. As shown in FIG. 5(C), in the second embodiment, an air gap 36 is formed between the slant surface 30C of the right-angled prism 30A and the wavelength division multiplexing filter 31 after the right-angled prism 30A and the hemisphere prism 30B are combined. The wavelength division multiplexing filter is generally designed such that a light beam incident on the wavelength division multiplexing filter through the air gap can be divided according to the wavelengths. Therefore, forming the air gap 36 in the second embodiment makes it possible to use a standard wavelength division multiplexing filter. Although the wavelength division multiplexing filter 31 is stuck to the slant surface of the hemisphere lens 30B, it is preferable to stick the film to the slant surface of the right-angled prism 30A if the direction of the incident light is opposite.

While the optical prism 30 in FIGS. 5(A) to 5(C) comprises a right-angled prism 30A and a hemisphere lens 30B, the same description can also apply to the one which comprises two right-angled prisms 30A and 30A' as described with reference to FIG. 3B.

According to the present invention, the optical prism 30A is formed by combining the right-angled prism 30A with the hemisphere lens 30B. In an optical prism by combining a general right-angled prism with a general hemisphere lens, it is not difficult to align the optical paths with each other. In each of the first and second embodiments, since convex lenses 33 and 34 are formed on the light incidence surfaces of the right-angled prism 30A, strict optical axis alignment is required when the right-angled prism 30A and the hemisphere lens 30B are combined with each other. However, using concavo-convex engagement for positioning as described above makes it possible to automatically complete optical axis alignment by combining the right-angled prism with the hemisphere lens.

Embodiment 3

In each of the first and second embodiments mentioned above, the optical module 1 is configured so that the light signal L2 from the light emitting portion 20 is focused by the convex lens 33 and reflected by the slant surface of the right-angled prism 30A' (or the surface joined with the hemisphere lens 30B) onto the optical fiber 51 while the light signal L1 emitted from the optical fiber 51 transmits through the slant surface of the right-angled prism 30A (or the surface joined with the hemisphere lens 30B) and the wavelength division multiplexing filter 31 and is focused by the hemisphere lens 30B onto the light receiving portion 10. In the case of a third embodiment, the optical module 1 is configured so as to allow surface mounting.

Figure 6:
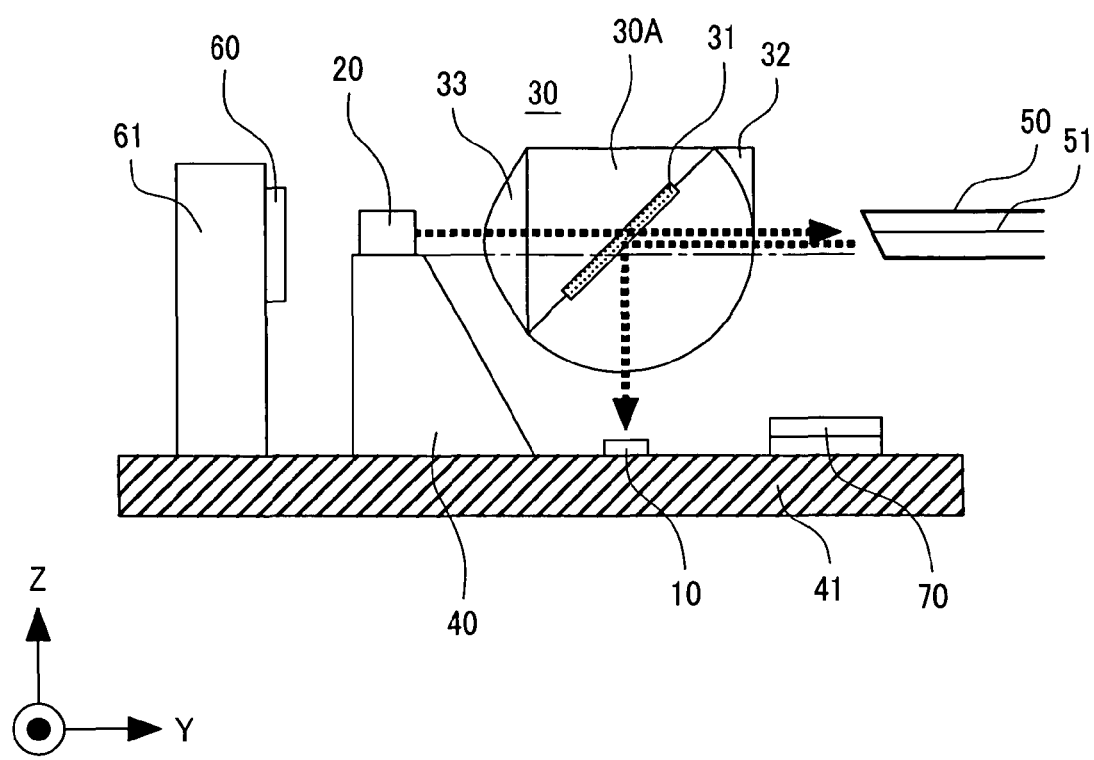
FIG. 6 shows a cross section of a third embodiment. This figure corresponds to FIG. 2 for the first embodiment.

FIG. 6 shows a cross section of the configuration according to the third embodiment, and the cross section corresponds to that shown in FIG. 2 in the first embodiment. As indicated by a thick dotted line, the light signal L2 from the light emitting portion diode 20 is focused by the convex lens 33, reflected by the slant surface of the right-angled prism 30A (or the surface joined with the hemisphere lens 30B) and the wavelength division multiplexing filter 31 and focused by the hemisphere lens 30B onto the optical fiber 51. Likewise, the light signal L1 emitted from the optical fiber 51 is focused by the hemisphere lens 30B, reflected by the slant surface of the right-angled prism 30A (or the surface joined with the hemisphere lens 30B) and the wavelength division multiplexing filter 31 and focused by the hemisphere lens 30B onto the light receiving portion 10. This configuration allows surface mounting. Also note that the convex lens 34 included in the first and second embodiments is not necessary in the third embodiment.

Embodiment 4

Figure 7:
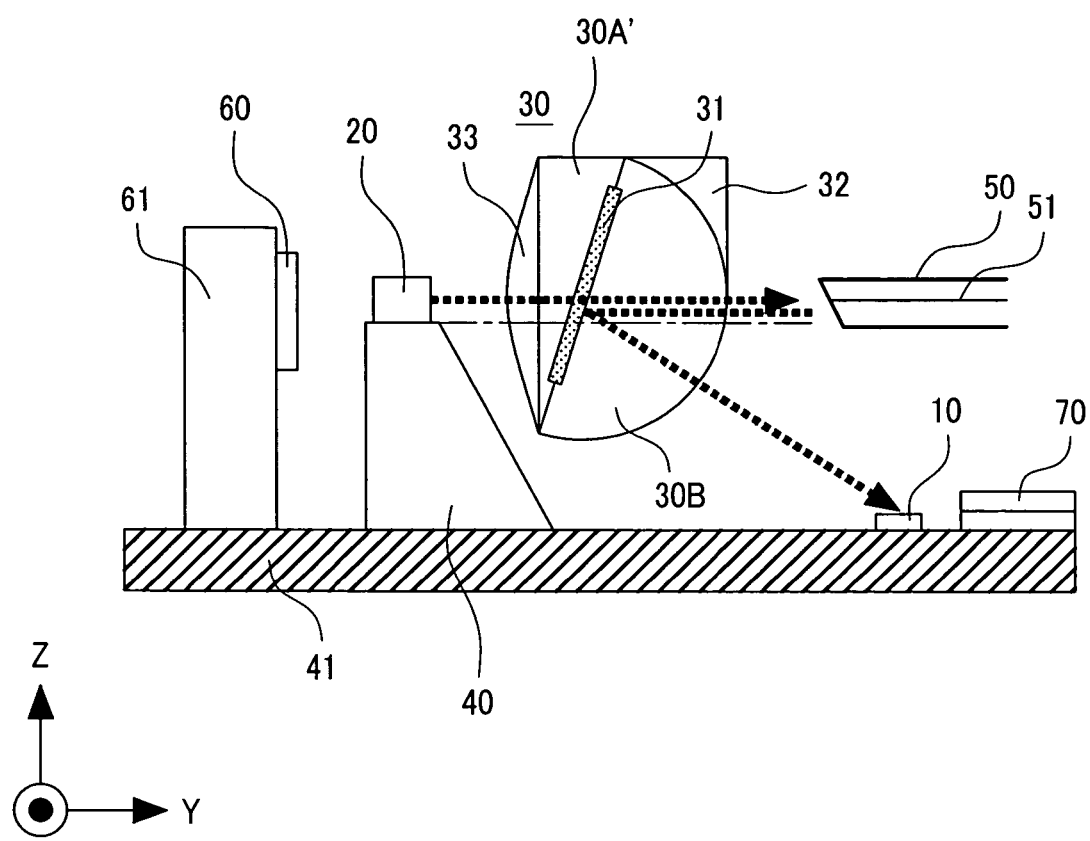
FIG. 7 shows a cross section of a fourth embodiment. This figure corresponds to FIG. 6 for the third embodiment.

FIG. 7 shows a cross section of a configuration according to a fourth embodiment, and the cross section corresponds to that shown in FIG. 6 in the third embodiment. The fourth embodiment is substantially the same as the above-mentioned third embodiment. The light signal L2 from the light emitting portion 20 enters the optical fiber 51 by following the same path as in the third embodiment shown in FIG. 6. As well, the light signal L1 emitted from the optical fiber 51 is focused by the hemisphere lens 30B, reflected by the slant surface of the prism 30A' (or the surface joined with the hemisphere lens 30B) and the wavelength division multiplexing filter 31 and focused by the hemisphere lens 30B onto the light receiving portion 10. This allows surface mounting.

Make comparison with the third embodiment. While each side surface of the right-angled triangular prism 30A used in the third embodiment is an isosceles right triangle, that of the right-angled triangular prism 30A' in the fourth embodiment is a scalene right triangle. Accordingly, the light signal L1 is reflected by the slant face of the prism 30A' (or the surface joined with the hemisphere lens 30B) at a deeper angle than 45 degrees with respect to the incidence direction. Generally, setting the angle deeper makes it easier to design/manufacture the wavelength division multiplexing filter 31. In the fourth embodiment, therefore, a wavelength division multiplexing filter 31 can be provided with a simple design and a low manufacturing cost.

Embodiment 5

Figure 8:
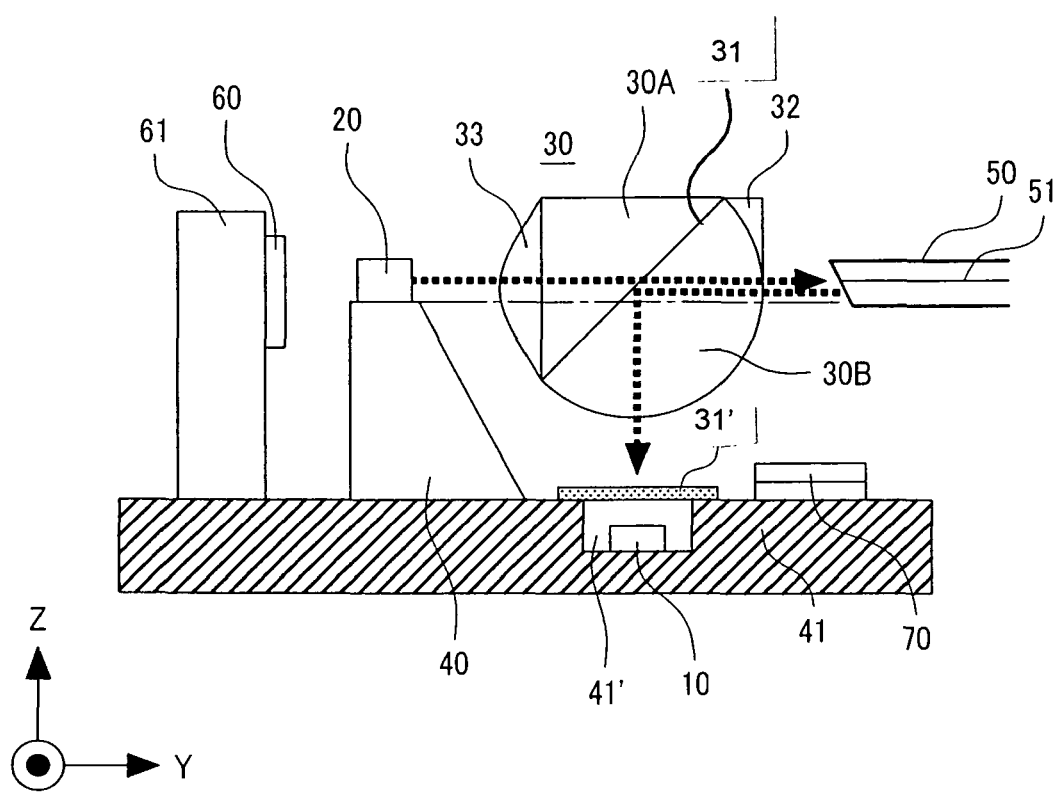
FIG. 8 shows a cross section of a fifth embodiment. This figure corresponds to FIG. 6 for the third embodiment.

FIG. 8 shows a cross section of a configuration according to a fifth embodiment, and the cross section corresponds to that shown in FIG. 6 in the third embodiment. Comparing FIG. 8 with FIG. 6, it is apparent that the fifth embodiment has the light receiving portion 10 held in a hollow portion 41' of the substrate 41. Further, in addition to a wavelength division multiplexing filter 31 provided between the slant surfaces of the right-angled prism 30A and hemisphere lens 30B which constitute the optical prism 30, a wavelength division multiplexing filter 31' is provided above the hollow 41' of the substrate 41 so as to veil the top surface of the light receiving portion 10. According to their wavelengths as indicated by thick dotted lines, the optical prism 30 controls the propagation direction of the light signal L1 from the light emitting portion 20 and that of the light signal L2 emitted from the optical fiber 51. Since the wavelength to be received by the light receiving portion 10 is selected twice by the two wavelength division multiplexing filters 31 and 31', crosstalk between the light signals L1 and L2 can be suppressed more effectively.

Embodiment 6

Figure 9A:
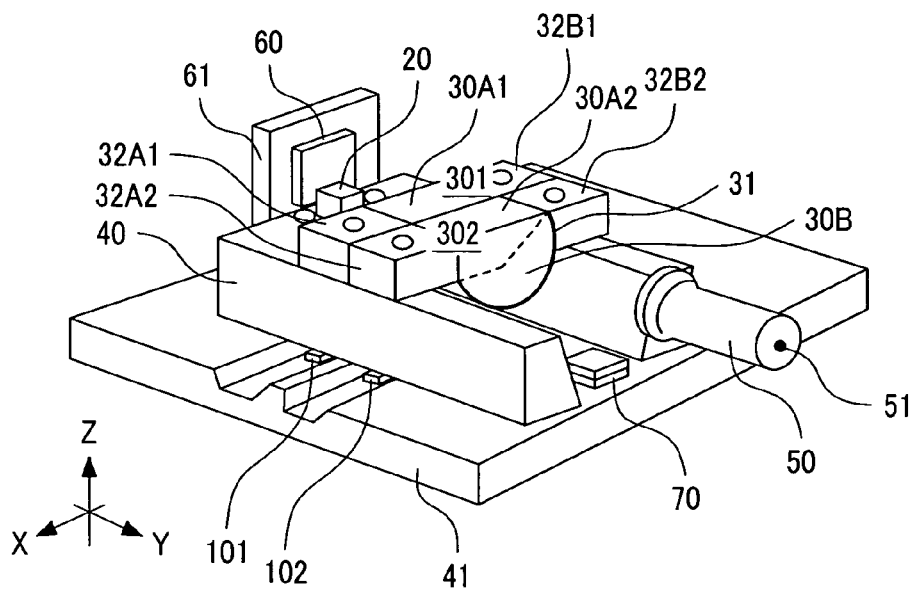
FIG. 9A schematically shows the configuration of a sixth embodiment. This figure corresponds to FIG. 1 where the configuration of the first embodiment is schematically shown.
Figure 9B:
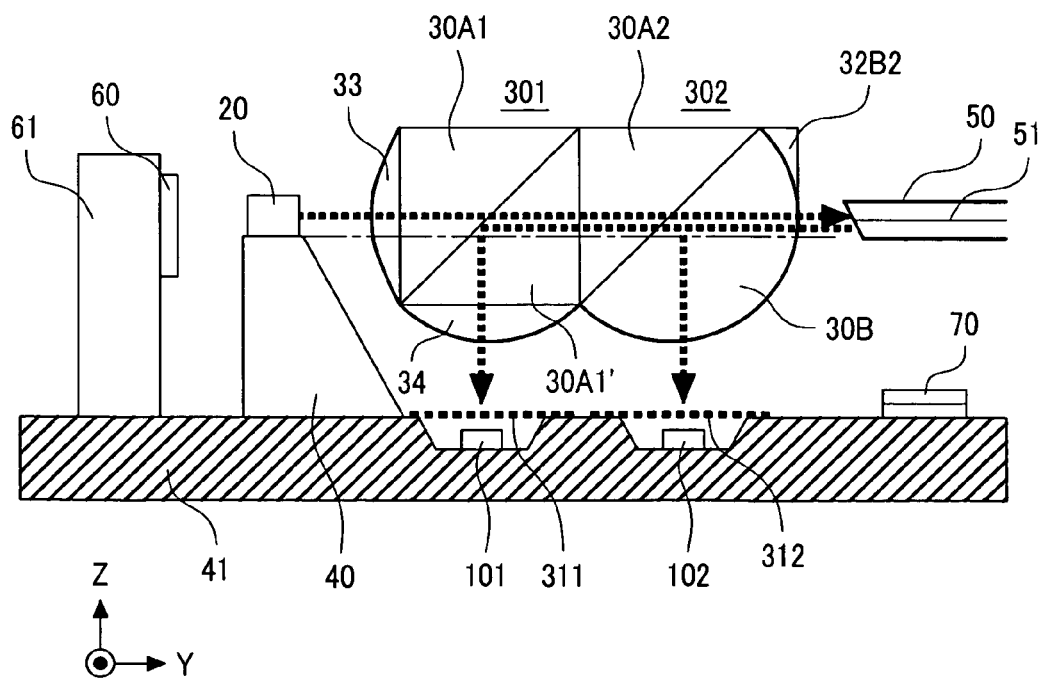
FIG. 9B shows a cross section of the sixth embodiment. This figure corresponds to FIG. 6 for the third embodiment.

While the first through fifth embodiments support bi-directional transmission with two different wavelengths, a sixth embodiment is configured to support bi-direction transmission with three different wavelengths. FIG. 9(A) is a schematic diagram showing the configuration of an optical module according to the sixth embodiment, and the configuration corresponds to that of the optical module shown in FIG. 1 in the first embodiment. FIG. 9(B) is a cross sectional diagram corresponding to that shown in FIG. 6 in the third embodiment.

Compare FIG. 9(A) with FIG. 1. FIG. 9(A) is a perspective view of the optical module of the sixth embodiment. Its can package base 80 and cap 81 are omitted in this figure. Since the optical module according to the sixth embodiment is designed for surface mounting, an optical fiber 51 protected by an optical fiber ferrule 50 is held on the side of the optical module. In addition, since two light signals are received, two directly coupled optical prisms 301 and 302 for optical communications are provided and two light receiving portions 101 and 102 are provided on the substrate 41 for the optical prisms 301 and 302, respectively.

FIG. 9(B) is an enlarged cross section view of the optical transceiver module according to the sixth embodiment. FIG. 9(B) shows the individual configurations and mutual relations of the substrate, sub-mount structure and main components (optical prisms, laser diode, photo diodes and optical fiber). Of the directly coupled optical prisms 301 and 302, the front optical prism 301 is similar to that described with reference to FIG. 3B. The front optical prism 301 comprises right-angled prisms 30A1 and 30A1' with their slant surfaces stuck to each other. A convex lens 33 is attached to the surface which faces a light emitting portion 20 and convex lens 34 is attached to the surface which faces a light receiving portion 101. As well, the rear optical prism 302 is similar to the optical prisms 30 configured in the first through fifth embodiments described above. It comprises a right-angled prism and a hemisphere lens with their slant surfaces attached to each other. A light receiving portion 102 is disposed on the substrate 41 so as to face the hemisphere lens 30B of the optical prism 302. Each of the optical prisms 301 and 302 has a wavelength division multiplexing filter 31 or 31' provided in the slant interface. The films transmit different wavelengths. In addition, wavelength division multiplexing filters 311 and 312 are provided above the light incidence surfaces of the respective light receiving portions 311 and 312. They transmit different wavelengths. The directly coupled optical prisms 301 and 302 have spectral characteristics to transmit one of three light signals of different wavelengths and reflect the other two light signals. Needless to say, the hemisphere lens 30B of the optical prism 302 in the present embodiment may be replaced by a right-angled prism as described in FIG. 3B.

Mounting supports 32A1, 32B1 and mounting supports 32A2 and 32B2 are formed in an integrated manner on the sides of the optical prism 301 and on the sides of the optical prism 302, respectively. These mounting supports may be formed to be common to the optical prism 301 and 302.

The optical module of the sixth embodiment supports bi-directional transmission with three wavelengths. The light signal L2 from the light emitting portion 20 is focused by the convex lens 33 of the front optical prism 301. Then, after transmitted by the wavelength division multiplexing filter 31 which is the junction surface between the two right-angled prisms 30A1 and 30A2 and the wavelength division multiplexing filter 31' which is the junction surface between the right-angled prism 30A2 and hemisphere lens 30B of the rear optical prism 302, the light signal L2 is focused by the hemisphere lens 30B onto the optical fiber 51. In addition, the two light signals L1 and L3 of different wavelengths emitted from the optical fiber 51 are focused by the hemisphere lens 30B into the rear optical prism 302. The light signal L1 is reflected by the junction surface between the right-angled prism 30A2 and the hemisphere lens 30B and focused by the hemisphere lens 30B onto the wavelength division multiplexing filter 312. The light signal L1 passes the wavelength division multiplexing filter 312 and enters the light receiving portion 102. The light signal L3 is reflected by the junction surface between the right-angled prisms 30A1 and 30A1' of the front optical prism 301 after passing the junction surface in the rear optical prism 302. Then, the light signal L3 is focused by the convex lens 34 onto the light receiving portion 101 through the wavelength division multiplexing filter 101.

The optical transceiver module which supports bi-directional transmission with three wavelengths, described above with reference to FIGS. 9(A) and (B), may be changed in configuration so as to form the optical prism 302 by combining two right-angled prisms as described with reference to FIG. 3B. In this case, a convex lens is provided on the surface onto which light is incident from the fiber. Needless to say, in this system to perform bi-directional transmission of multiple light signals with different wavelengths, the light emitting portion 20 generates a light signal of a single wavelength while plural light signals of different wavelengths are received.

Also note that although the substrate 41 and the sub-mount 40 in each aforementioned embodiment are combined after prepared separately, they may be formed in an integrated fashion.

While several optical prisms and optical transceiver modules have been described above in preferred embodiments of the present invention, the present invention is not limited to these embodiments.

The present invention can be implemented by the following configurations.

1. An optical transceiver module comprises: a substrate; a square U-shape sub-mount disposed on the substrate; a light emitting portion disposed on the top portion of the sub-mount; two light receiving portions disposed on the substrate; a first composite optical prism for optical communications; and a second composite optical prism for optical communications. The first composite optical prism has a first right-angled prism and a second right-angled prism formed in an integrated manner. A slant surface of the first angled prism opposes a slant surface of the second angled prism through a wavelength division multiplexing filter sandwiched between the two right angled prisms. The first and second right angled prisms are in plane symmetry with respect to the slant surfaces. The first composite optical prism is configured such that the two surfaces forming a right angle of each of the two right-angled prisms onto which and from which light is emitted have a lens function. A mounting support is provided on each side of the first composite optical prism. The mounting supports extend perpendicularly to the optical path of light incoming onto and outgoing from the first composite optical prism. The second composite optical prism is cascaded with the first composite optical prism and has a right angled prism and a hemisphere lens formed in an integrated manner. A slant surface of the angled prism opposes a slant surface of the hemisphere lens through a wavelength division multiplexing filter sandwiched between the right angled prism and the hemisphere lens. The second composite optical prism is configured such that the two surfaces forming a right angle of the right angled prism onto which and from which light is emitted have a lens function. A mounting support is provided on each side of the second composite optical prism. The mounting supports extend perpendicularly to the optical path of light incoming onto and outgoing from the second composite optical prism. The mounting supports of the first and second composite optical prisms are held and positioned on the wing portions of the sub-mount so that light emitted from the light emitting portion is incident on the first composite optical prism and such that the light outgoing from the first composite optical prism and the light outgoing from the second composite optical prism are incident on the two corresponding light receiving portions.

2. An optical transceiver module according to Paragraph 1 is configured such that the two right-angled prisms of the first composite optical prism and the right-angled prism and the hemisphere lens of the second composite optical prism are each provided with a positioning portion, which is provided on the respective slant surface, for defining the relative position of the two right-angled prisms and the relative position of the right-angled prism and the hemisphere prism, respectively.

3. An optical transceiver module according to Paragraph 1 is configured such that either of the two slant surfaces of the right-angled prisms of the first composite optical prism and either of the two slant surfaces of the right-angled prism and the hemisphere lens of the second composite optical prism each have an air gap formed between the wavelength division multiplexing filter.

3. An optical transceiver module according to Paragraph 1 further comprises: guide marks provided on the top portion of the sub-mount for positioning the light emitting portion; guide marks provided on the substrate for positioning the light receiving portions; and guide marks provided on top of the wing portions of the sub-mount for positioning the mounting supports.

4. An optical transceiver module according to Paragraph 1 is configured such that in addition to the wavelength division multiplexing filters provided respectively between the first right-angled prism and the second right-angled prism of the first composite optical prism and between the first right-angled prism and hemisphere lens of the second composite optical prism, two wavelength division multiplexing filters are disposed in the respective optical paths on the light incidence side of the two light receiving portions provided on the substrate.

5. An optical transceiver module according to Paragraph 1 is configured such that the hemisphere lens of the second composite optical prism is replaced by a second right-angled prism. The first and second right-angled prisms are in plane symmetry with respect to the slant surfaces.

6. An optical transceiver module according to Paragraph 1 is configured such that the substrate and the sub-mount are formed as a single component.

7. An optical transceiver module according to Paragraph 3 is configured such that the mounting supports of the first and second composite optical prism are provided with alignment marks corresponding to the marks provided on the sub-mount.

What is claimed is:

1. A composite optical prism for optical communications that is assembled by combining a first right-angled prism and a hemisphere lens so that the slant surface of the first right-angled prism and the slant surface of the hemisphere lens face each other through a wavelength division multiplexing filter sandwiched between the first right-angled prism and the hemisphere lens, wherein:
   at least one of the two mutually perpendicular rectangular surfaces of the first right-angled prism comprises a lens or a zone plate, which is positioned to function as a lens in an optical path of light incoming onto and outgoing from the composite optical prism; and
   each side of the composite optical prism is provided with a mounting support that extends perpendicularly to the optical path of light incoming onto and outgoing from the composite optical prism.

2. A composite optical prism for optical communications that is assembled by combining a first right-angled prism and a second right-angled prism so that the slant surface of the first right-angled prism and the slant surface of the second right-angled prism face each other through a wavelength division multiplexing filter sandwiched, wherein:
   at least one of two mutually perpendicular rectangular surfaces in each of the first and second right-angled prisms comprises a lens or a zone plate, which is positioned to function as a lens in an optical path of light incoming onto and outgoing from the composite optical prism,
   each side of the composite optical prism is provided with a mounting support that extends perpendicularly to the optical path of light incoming onto and outgoing from the composite optical prism, and
   the first and second right-angled prisms are in plane symmetry with respect to respective slant surfaces of the first and second right-angled prisms.

3. The composite optical prism for optical communications according to claim 1, wherein
   each of the first right-angled prism and the hemisphere lens is provided with a positioning portion on the slant surface thereof for defining the relative position thereof.

4. The composite optical prism for optical communications according to claim 2, wherein
   each of the first and second right-angled prisms is provided with a positioning portion on the slant surface thereof for defining the relative position thereof.

5. The composite optical prism for optical communications according to claim 1, wherein
   the composite optical prism has an air gap formed between the wavelength division multiplexing filter and either of the slant surface of the first right-angled prism or the slant surface of the hemisphere lens.

6. The composite optical prism for optical communications according to claim 2, wherein
   the composite optical prism has an air gap formed between the wavelength division multiplexing filter and either of the slant surface of the first right-angled prism or the slant surface of the second right-angled prism.

7. The composite optical prism for optical communications according to claim 1, wherein
   each side surface of the first right-angled prism is an isosceles right-angled triangle.

8. The composite optical prism for optical communications according to claim 2, wherein
each side surface of the second right-angled prism is an isosceles right-angled triangle.

9. The composite optical prism for optical communications according to claim 1, wherein
each side surface of the first right-angled prism is a scalene right-angled triangle.

10. An optical transceiver module comprising:
a substrate;
a square U-shape sub-mount disposed on the substrate;
a light emitting portion disposed on the top portion of the sub-mount;
a light receiving portion disposed on the substrate; and
a composite optical prism for optical communications that is assembled by combining a first right-angled prism and a hemisphere lens so that the slant surface of the first right-angled prism and the slant surface of the hemisphere lens face each other through a wavelength division multiplexing filter sandwiched between the first right-angled prism and the hemisphere lens, wherein at least one of the two mutually perpendicular rectangular surfaces of the first right-angled prism comprises a lens or a zone plate, which is positioned to function as a lens in an optical path of light incoming onto and outgoing from the composite optical prism, and each side of the composite optical prism is provided with a mounting support that extends perpendicularly to the optical path of light incoming onto and outgoing from the composite optical prism,
wherein the mounting supports of the composite optical prism are held and positioned on top of the respective wing portions of sub-mount so that light emitted from the light emitting portion is incident on the composite optical prism and the light emitted from the composite optical prism is incident on the light receiving portion.

11. The optical transceiver module according to claim 10, wherein
each of the first right-angled prism and the hemisphere lens is provided with a positioning portion on the slant surface thereof for defining the relative position thereof.

12. The optical transceiver module according to claim 10, wherein
the composite optical prism has an air gap formed between the wavelength division multiplexing filter and either of the slant surface of the first right-angled prism or the slant surface of the hemisphere lens.

13. The optical transceiver module according to claim 10, further comprising:
guide marks provided on the top portion of the sub-mount for positioning the light emitting portion;
guide marks provided on the substrate for positioning the light receiving portion; and
guide marks provided on top of the wing portions of the sub-mount for positioning the mounting supports.

14. The optical transceiver module according to claim 10, wherein
in addition to the wavelength division multiplexing filter provided between the slant surface of the first right-angled prism and the slant surface of the hemisphere lens, a wavelength division multiplexing filter is disposed in the optical path on the light incidence side of the light receiving portion provided on the substrate.

15. An optical transceiver module comprising:
a substrate;
a square U-shape sub-mount disposed on the substrate;
a light emitting portion disposed on the top portion of the sub-mount;
a light receiving portion disposed on the substrate; and
a composite optical prism for optical communications that is assembled by combining a first right-angled prism and a second right-angled prism so that the slant surface of the first right-angled prism and the slant surface of the second right-angled prism face each other through a wavelength division multiplexing filter sandwiched between the first right-angled prism and the second right-angled prism, wherein at least one of two mutually perpendicular rectangular surfaces in each of the first and second right-angled prisms comprises a lens or a zone plate, which is positioned to function as a lens in an optical path of light incoming onto and outgoing from the composite optical prism, and each side of the composite optical prism is provided with a mounting support that extends perpendicularly to the optical path of light incoming onto and outgoing from the composite optical prism, and
wherein the mounting supports of the composite optical prism are held and positioned on top of the respective wing portions of sub-mount so that light emitted from the light emitting portion is incident on the composite optical prism and the light emitted from the composite optical prism is incident on the light receiving portion,
the first and second right-angled prisms being in plane symmetry with respect to the slant surfaces.

16. The optical transceiver module according to claim 15, wherein
each of the first and second right-angled prisms is provided with a positioning portion on the slant surface thereof for defining the relative position thereof.

17. The optical transceiver module according to claim 15, wherein
the composite optical prism has an air gap formed between the wavelength division multiplexing filter and either of the slant surface of the first right-angled prism or the slant surface of the second right-angled prism.

18. The optical transceiver module according to claim 15, wherein
in addition to the wavelength division multiplexing filter provided between the slant surface of the first right-angled prism and the slant surface of the second right-angled prism, a wavelength division multiplexing filter is disposed in the optical path on the light incidence side of the light receiving portion provided on the substrate.

19. The optical transceiver module according to claim 10, wherein the substrate and the sub-mount are formed as a single component.

20. The optical transceiver module according to claim 13, wherein the mounting supports of the composite optical prism are provided with alignment marks corresponding to the marks provided on the sub-mount.

21. An optical transceiver module comprising:
a substrate;
a rhomboid, U-shaped sub-mount disposed on the substrate;
a first optical element disposed on the U-shaped sub-mount;
a second optical element disposed on the substrate and inside an area at least partially enclosed by the U-shaped sub-mount; and
an optical prism for optical communications disposed over the area at least partially enclosed by the U-shaped sub-mount;

wherein one of the first and the second optical elements is a light emitting element, and the other of the first and the second optical elements is a light receiving element, wherein the optical prism for optical communications includes a first right-angled prism, a wavelength division multiplexing filter, and mounting supports, wherein the wavelength division multiplexing filter is disposed on an inclined surface of the first right-angled prism, wherein the mounting supports are each formed on a triangular surface of the first right-angled prism, and wherein the mounting supports are each fixed on respective wing portion of the U-shaped sub-mount such that one of light transmitted through the inclined surface of the first right-angled prism and light reflected at the inclined surface of the first right-angled prism is optically coupled with the light receiving element, and the other of the light transmitted through the inclined surface of the first right-angled prism and the light reflected at the inclined surface of the first right-angled prism is optically coupled with the light emitting element.

22. The optical transceiver module according to claim 21, wherein the inclined surface of the first right-angled prism faces a side of the substrate.

23. The optical transceiver module according to claim 21, wherein each side surface of the first right-angled prism has an isosceles, right-angled triangle-shape.

24. The optical transceiver module according to claim 21, wherein each side surface of the first right-angled prism has a scalene right-angled triangle-shape.

25. The optical transceiver module according to claim 21, further comprising a lens disposed on the first right-angled prism of the optical prism for optical communications between the first right-angled prism and the light receiving element.

26. The optical transceiver module according to claim 25, wherein the lens is one of a spherical lens, an aspheric lens, and a diffraction optical device.

27. The optical transceiver module according to claim 21, further comprising a lens disposed on the first right-angled prism of the optical prism for optical communications between the first right-angled prism and the light emitting element.

28. The optical transceiver module according to claim 21, wherein the substrate and the U-shaped sub-mount are formed from a semiconductor material.

29. The optical transceiver module according to claim 28, wherein the semiconductor material is silicon.

30. The optical transceiver module according to claim 22, further comprising a second right-angled prism combined with the first right-angled prism at the inclined surface through the wavelength division multiplexing filter, and wherein the first and the second right angled prisms are in plane symmetry with respect to the inclined surface.

31. The optical transceiver module according to claim 30, further comprising a lens disposed on a surface of the second right-angled prism, and wherein light transmitted through the first right-angle prism, the wavelength division multiplexing filter, and the inclined surface of the second right-angled prism is emitted from the surface of the second right-angled prism through the lens disposed thereon.

* * * * *